United States Patent [19]

Tinker

[11] Patent Number: 5,718,190

[45] Date of Patent: Feb. 17, 1998

[54] PICKUP TRUCK BED DOG RESTRAINT SYSTEM

[76] Inventor: Mark A. Tinker, 237 N. Boulder Ter., Tucson, Ariz. 85745

[21] Appl. No.: 600,831

[22] Filed: Feb. 13, 1996

[51] Int. Cl.$^6$ .......................... B60R 22/00; B60R 22/12; B60R 22/34
[52] U.S. Cl. .................... 119/771; 119/784; 119/797
[58] Field of Search .......................... 119/770, 771, 119/795, 784, 797

[56] References Cited

U.S. PATENT DOCUMENTS

| | | |
|---|---|---|
| D. 343,032 | 1/1994 | Carrero . |
| D. 360,711 | 7/1995 | O'Neill . |
| 4,252,084 | 2/1981 | Willow . |
| 4,791,886 | 12/1988 | Anderson . |
| 4,827,876 | 5/1989 | Krekelberg . |
| 4,834,027 | 5/1989 | Meyer . |
| 4,892,063 | 1/1990 | Garrigan ................... 119/795 |
| 4,899,694 | 2/1990 | Belluomini . |
| 4,947,801 | 8/1990 | Glass . |
| 4,958,597 | 9/1990 | Mildner . |
| 5,373,814 | 12/1994 | Seymour . |
| 5,551,379 | 9/1996 | Hart ........................ 119/771 |
| 5,598,812 | 2/1997 | Graham et al. ............. 119/771 |

Primary Examiner—Mark Polutta
Attorney, Agent, or Firm—LaRiviere, Grubman & Payne

[57] ABSTRACT

Animal restraint system for use in safely transporting non-caged animals, such as dogs, on a pickup truck bed. The system includes a four-point anchored arrangement of straps that facilitate a lengthwise symmetrical placement of the animal restraint system within the bed of a pickup truck. The system includes a plurality of anchor devices secured to the forward and rear corner areas of a truck bed, a first cross-strap arrangement, including a pair of adjustable length strap members mechanically joined at one end and having respective mechanical anchors at another end, and a second cross-strap arrangement, including a pair of fixed length strap members mechanically joined at one end and also having mechanical anchors at another end. Each mechanical anchor associated with each cross-strap arrangement being mechanically secured to the anchor devices at the forward and rear corner areas of the truck bed. The system further includes an interconnecting strap member for attachment of a leash member and which is centrally and mechanically joined at opposing ends to the first and second cross-strap arrangements. The leash member includes an attachment structure that facilitates an animal being restrained to freely move along the interconnecting strap member. The restraint system is adjustable for conforming to various sizes of pickup truck beds and is especially suitable for safely transporting dogs that weigh one hundred (100) pounds.

12 Claims, 3 Drawing Sheets

PICKUP TRUCK BED DOG RESTRAINT SYSTEM

FIELD OF THE INVENTION

The present invention relates to animal restraint systems. More particularly, the present invention relates to animal restraint systems for use in transporting animals. Even more particularly, the present invention relates to dog restraint systems for transporting dogs within a pickup truck bed.

DESCRIPTION OF THE PRIOR ART

Various animal restraint systems have been patented that relate to solving the common problem of preventing accidental falling of pet dogs from the back of a pickup truck bed. Notably, U.S. Pat. No. 4,252,084 and Des. 360,711 teach a restraint system anchored at the cab end of a pickup truck bed and the use a pulley system to facilitate side leash motion. U.S. Pat. Nos. 4,827,876, 4,834,027 and 4,899,694 teach a two-anchor point restraint system. U.S. Pat. Nos. 4,791,886 and 4,947,801 teach restraint systems that facilitate front to rear movement of the animal. Other patents that are deemed cumulative to the teachings include U.S. Pat. Nos. Des. 343,032, 4,958,597 and 5,373,814.

While the prior art teachings basically have resolved the problem of accidental falling of dogs from pickup truck beds, the freedom of movement of the animal has been compromised. Accordingly, a need is seen to exist for an animal restraint system that continues to provide for the safe transportation of the animal in the back of a pickup truck bed, but that further maximizes the utilization of the space provided by the pickup truck bed by providing structure that allows the restraint animal, especially large animals weighing upwards of 100 pound, to move about the entire space.

It is therefore a primary object of the present invention to provide a four-anchor point animal restraint system adapted for utilization on pickup truck beds and which safely confines an animal, such as a dog, to the interior boundaries of the pickup truck bed, and which further provides a structural arrangement that allows a large dog, restraint by the system, to freely move about pickup truck bed area.

SUMMARY OF THE INVENTION

Accordingly, the foregoing object is accomplished by providing an animal restraint system for a pickup truck bed that utilizes the plurality of anchor devices typically provided at the forward and rear corner areas of pickup truck beds. The animal restraint system, in accordance with the present invention, includes a first and second cross-strap arrangement connected by an interconnecting strap member that carries a plurality of leash members. The first cross-strap arrangement comprises a pair of adjustable length strap members that are mechanically joined at one end, and that terminate at another end with their respective mechanical anchoring means. Each of the respective mechanical anchoring means being mechanically secured to a respective one of the plurality of anchor devices secured at the forward corner areas of the pickup bed. The second cross-strap arrangement comprises a pair of fixed length strap members mechanically joined at one end and are similarly provided with respective mechanical anchoring means at another end. Each respective mechanical anchoring means also being mechanically secured to a respective one of said plurality of anchor devices secured at said rear corner areas. The interconnecting strap member is provided as an adjustable length strap portion having each of its ends centrally and mechanically joined to the first and second cross-strap arrangements. The at least one leash member is attached to the interconnecting strap member via an attachment structure that facilitates the leash being moved along the interconnecting strap portion.

Therefore, to the accomplishments of the foregoing object, the invention consists of the foregoing features hereinafter fully described and particularly pointed out in the claims, the accompanying drawings and the following disclosure describing in detail the invention, such drawings and disclosure illustrating but one of the various ways in which the invention may be practiced.

DESCRIPTION OF THE PREFERRED EMBODIMENT OF THE INVENTION

Figure 1:
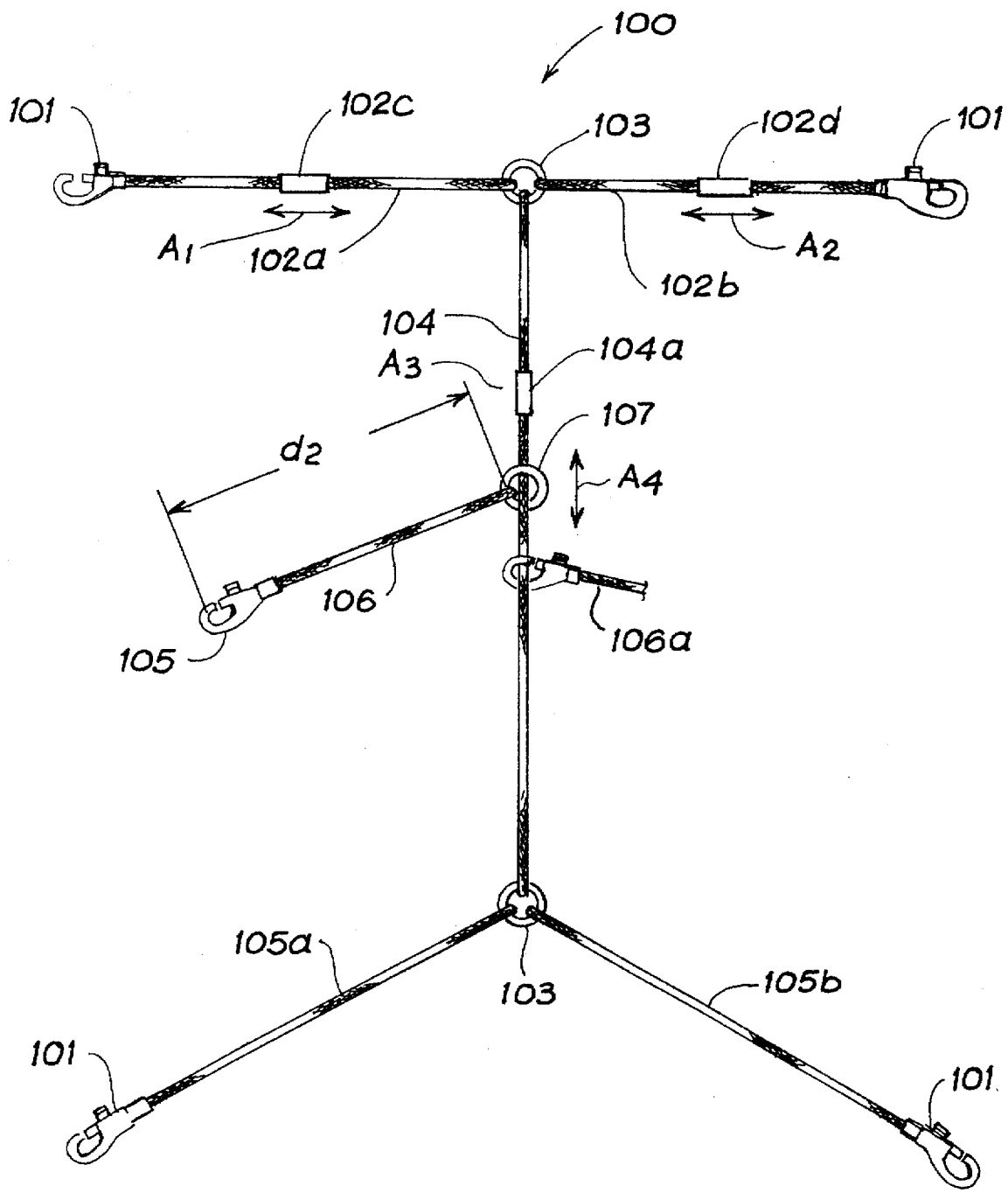
FIG. 1 is a top plan view of the animal restraint system of the present invention.

FIG. 1 illustrates an animal restraint system 100 in accordance with the present invention, including a first and second cross-strap arrangement (102a, 102b), (105a, 105b) connected by an interconnecting strap member 104 that carries a plurality of leash members 106, 106a. As illustrated, the first cross-strap arrangement is preferably formed by a pair of adjustable length strap members 102a, 102b that are mechanically joined at one end by means of a ring fastener 103. Each strap member 102a, 102b is provided with a respective mechanical anchoring means, such as a snap hooks 101 at another end. Additionally, strap members 102a and 102b are each provided with a length adjustment buckle 102c, 102d for purposes of dimensionally conforming the first cross-strap arrangement, as depicted by arrows A1, A2, for attachment of hooks 101 to respective mating anchor devices 201, 202 located at the frontmost corners of a pickup truck bed 200, see generally FIG. 2.

Referring back to FIG. 1, the second cross-strap arrangement is preferably formed from a pair of fixed length strap members 105a, 105b that are mechanically joined at one end by means of a ring fastener 103. Each fixed length strap member 105a, 105b is also provided at another end with a respective mechanical anchoring means, such as snap hooks 101, for use in mechanically securing the second cross strap arrangement to a respective one of the anchor devices 203, 204 located at the rear corners of pickup truck bed 200, see generally FIG. 2.

FIG. 1 also shows interconnecting strap member 104 as being preferably formed as an adjustable length strap portion having one end centrally and mechanically joined to the first cross-strap arrangement members 102a, 102b at ring fastener 103, and similarly, centrally and mechanically joined at another end to the second cross-strap arrangement members 105a, 105b at ring fastener 103. Additionally, interconnecting strap member 104 is provided with a length adjustment buckle 104a for purposes of dimensionally conforming the distance between the first cross-strap arrangement and the second cross-strap arrangement, as depicted by arrow A3, to suit the length of the pickup truck bed and to assure confinement of a dog being restraint to the boundaries of the pickup truck bed, in particular the rear tailgate boundary, see generally FIG. 2 showing distance d4 preferably being greater than or equal to distance d2 associated with leash member 106.

Referring back to FIG. 1, animal restraint system 100 is provided with a pair of leash members 106, 106a that are loosely attached to interconnecting strap member 104 by means of attachment structure, such as ring fastener 107 on leash member 106, or such as snap hook 101a on detachable leash member 106a. The enclosing structure of ring fastener 107 and snap hook 101a must be larger than the body size of strap 104, including buckle 104a, to facilitate unobstructed movement of leash member 106, 106a along the entire length of interconnecting strap 104, as indicated by movement arrow A4. The end of leash 106 is provided with a snap hook 101 to facilitate attachment to the collar being worn by a dog that is to be restrained. Preferably, the dog collar is a harness type collar 108 that provides added safety for the animal by providing upper body securement instead of neck securement. In one embodiment of the present invention, leash member 106 comprise a harness 108 for securement to a dog.

Figure 2:
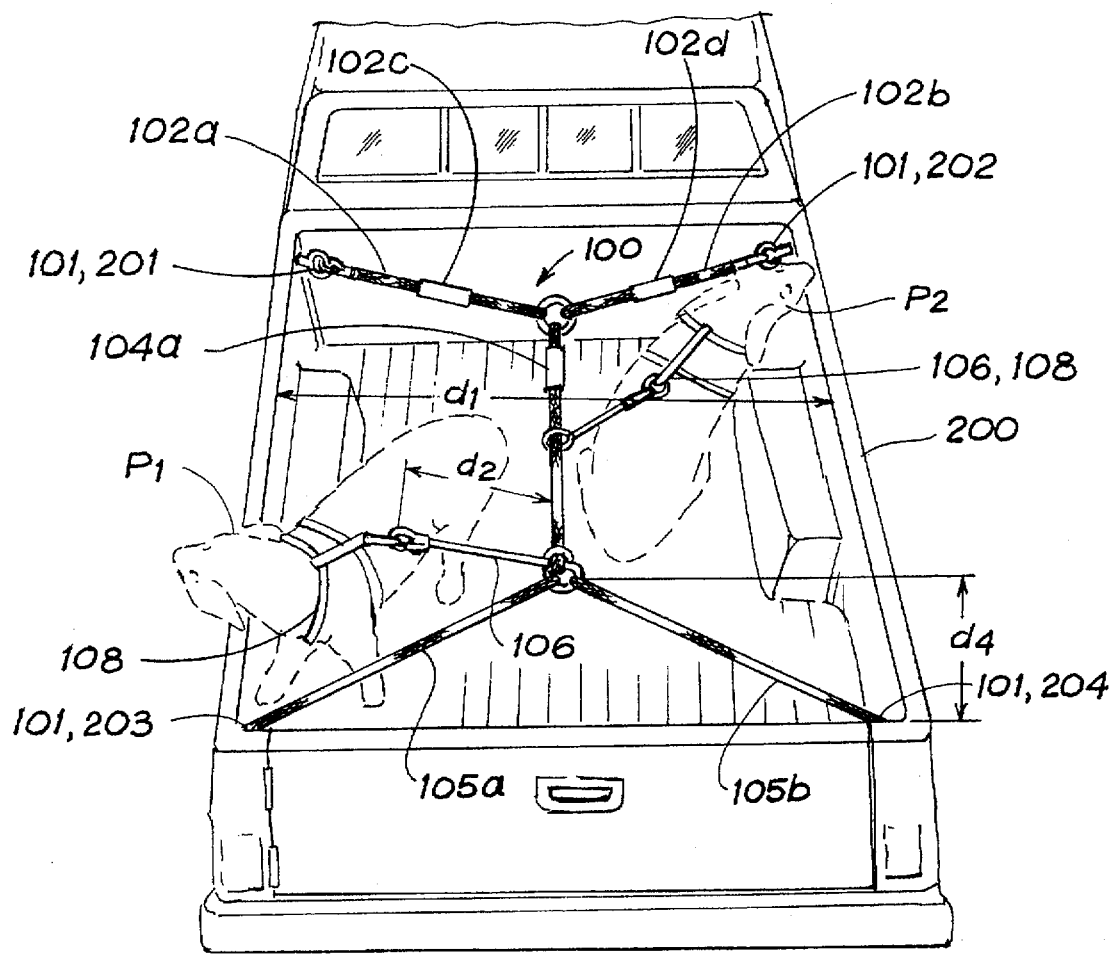
FIG. 2 is a perspective pictorial view of a pickup truck open bed illustrating a preferred mounting arrangement of the present invention as used for restraining at least two large dogs.
Figure 3:
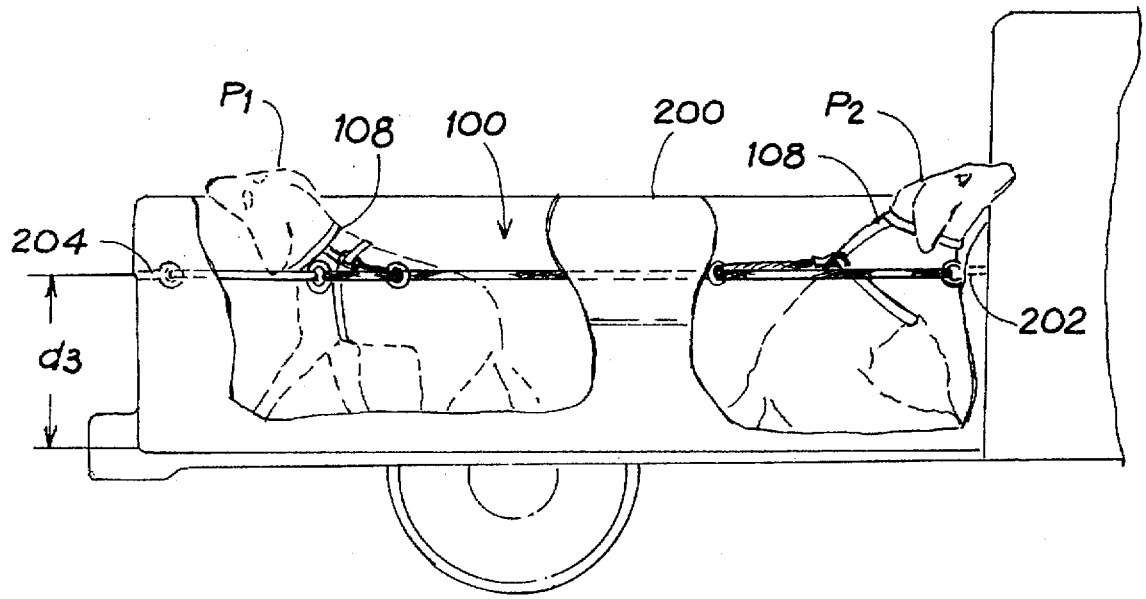
FIG. 3 is a partially cutaway side elevational view of a pickup truck bed illustrating a preferred front and rear mounting arrangement of the dog restraint system of the present invention as used for restraining two large dogs.

FIG. 2 shows dog restraint system 100 preferably mounted to the four corners 201, 202, 203, 204 of a typical pickup truck bed. Although not shown, system 100 could be readily designed and adapted for being anchored to other structures, by example, an outdoor dog run. As shown in FIG. 2, system 100 has been secured and adjusted, by manipulation of buckles 102c, 102d and 104a, to conform to the width d1 of pickup truck bed 200 and to the length of the bed to assure restricted travel by pet dogs P1, P2 into the back portion of the bed indicated by distance d4. As previously stated, the distance d4 must be greater than or equal to the length d2 of leash member 106, 106a to assure that dogs P1, P2 cannot jump over the tailgate of the pickup bed. The combined length of second cross-strap arrangement members 105, 105a is greater than d1 and is determined by factoring the distances d2/d4. FIG. 3 shows a side elevational view of the mounted dog restraint system 100 on bed 200. Preferably, the bed of a pickup truck has been previously provided with anchoring devices 202, 204 that are mounted a distance d3 which is approximately two-thirds of the depth of the pickup bed, as measured from the bottom of the bed. The elevated positioning allows substantial freedom of movement of pets P1, P2, especially large dogs weighing 100 pounds. In one embodiment of the present invention, the pickup truck bed anchoring devices 201, 202, 203, 204 are include as part of the restraint system.

Figure 4:
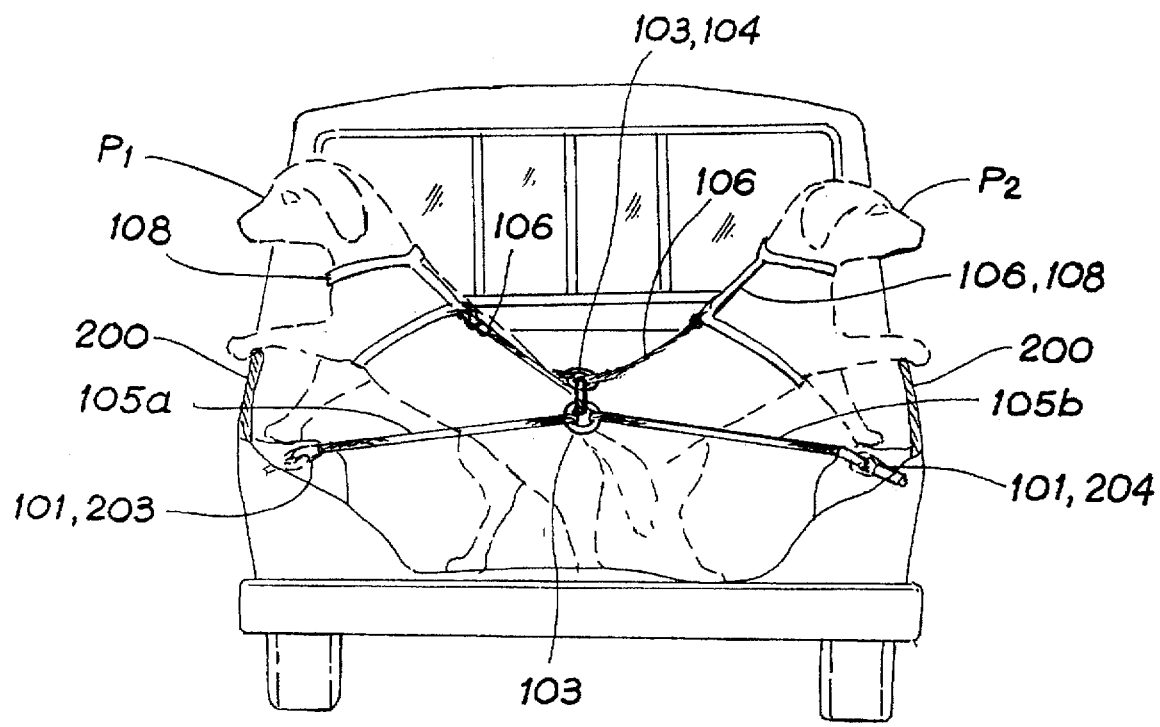
FIG. 4 is a partially cutaway rear elevational view of a pickup truck bed illustrating both preferred rear mounting points for the dog restraint system of the present invention as used for restraining two large dogs.

FIG. 4 shows a rear elevational view of the mounted dog restraint system 100 on bed 200. As previously discussed, the elevated positioning of system 100 allows substantial freedom of movement of pets P1, P2, especially large dogs weighing 100 pounds that like to position themselves on the sides of the pickup truck bed.

The preferred material for system 100 is nylon having a high tensile strength provided in web-like construction and commercially available in long straps. The terminating devices such as snap hook 100, ring fastener 103 are fixedly attached to the respective strap ends for rugged action and sustained end use for restraining large 100 pound dog being transported. Although the preferred material is in the form of a substantially flat strap material, other material can be substituted and obtain similar useful results. By example, the material may be provided in the form of a chain structure, a rope structure, or may be constructed using leather straps, rod-like or pipe material.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus.

I claim:

1. An animal restraint system comprising:
   a first cross-structure arrangement, said first cross-structure arrangement comprising a pair of adjustable length structural members mechanically joined at one end, each structural member having a respective mechanical anchoring means at another end;
   a second cross-structural arrangement, said second cross-structural arrangement comprising a pair of fixed length structural members mechanically joined at one end, each fixed length structural member also having a respective mechanical anchor means at another end;
   an interconnecting structural member for attachment of at least one leash member, said interconnecting structural member comprising an adjustable length structural portion having one end mechanically joined to said first cross-structural arrangement and another end mechanically joined to said second cross-structural arrangement; and
   at least one leash member attached to said interconnecting structural member, said at least one leash member having attachment structure for facilitating being moved along said adjustable length structural portion.

2. An animal restraint system as described in claim 1, wherein:
   said adjustable length structural members, said fixed length structural members, and said adjustable length structural portion, which are associated with said first cross-structure arrangement, said second cross-structure arrangement and said interconnecting structural member, respectively, comprise flexible webbing strap material.

3. An animal restraint system as described in claim 1, wherein:
   said adjustable length structural members, said fixed length structural members, and said adjustable length structural portion, which are associated with said first cross-structure arrangement, said second cross-structure arrangement and said interconnecting structural member, respectively, comprise chain material.

4. An animal restraint system as described in claim 1, wherein:
   said adjustable length structural members, said fixed length structural members, and said adjustable length structural portion, which are associated with said first cross-structure arrangement, said second cross-structure arrangement and said interconnecting structural member, respectively, comprise leather material.

5. An animal restraint system as described in claim 4, wherein:
   said at least one leash member being a harness type leash member.

6. An animal restraint system comprising:
   a first cross-structure arrangement, said first cross-structure arrangement comprising a respective mechanical anchoring means at each end;

a second cross-structural arrangement, said second cross-structural arrangement also comprising respective mechanical anchor means at each end;

an interconnecting structural member, said interconnecting structural member having one end mechanically joined to said first cross-structural arrangement and another end mechanically joined to said second cross-structural arrangement; and at least one leash member attached to said interconnecting structural member, said at least one leash member having attachment structure that facilitates free movement of said at least one leash member along said interconnecting structural member.

7. An animal restraint system for a truck bed, said system comprising:

a plurality of anchor devices for securing to forward and rear corner areas of said truck bed;

a first cross-strap arrangement, said first cross-strap arrangement comprising a pair of adjustable length strap members mechanically joined at one end, each strap member comprises a respective mechanical anchoring means at another end, each said respective mechanical anchoring means being mechanically secured to a respective one of said plurality of anchor devices;

a second cross-strap arrangement, said second cross-strap arrangement comprising a pair of fixed length strap members mechanically joined at one end, each fixed length strap member also comprises a respective mechanical anchoring means at another end, each said respective mechanical anchoring means being mechanically secured to a respective one of said plurality of anchor devices;

an interconnecting strap member for attachment of at least one leash member, said interconnecting strap member comprising an adjustable length strap portion having one end centrally and mechanically joined to said first cross-strap arrangement and another end centrally and mechanically joined to said second cross-strap arrangement; and at least one leash member attached to said interconnecting strap member, said at least one leash member having attachment structure for facilitating being moved along said adjustable length strap portion.

8. An animal restraint system as described in claim 7, wherein:

said pair of adjustable length strap members, said pair of fixed length strap members, and said adjustable length strap portion comprise being dimensionally adjusted and dimensionally provided to dimensionally conform to a predetermined size of said truck bed such that a dog being restrained by said at least one leash member is safely confined at all times to a space delineated by said truck bed.

9. An animal restraint system as described in claim 8, wherein:

said attachment structure being detachable from said adjustable length strap portion.

10. An animal restraint system as described in claim 8, wherein:

said attachment structure being non-detachable from said adjustable length strap-portion.

11. A method of safely restraining a dog to the confines of a truck bed, said method comprising the steps of:

(a) providing a truck bed having a plurality of anchor devices secured to forward and rear corner areas of said truck bed;

(b) providing a dog restraint system comprising:

(i) a first cross-strap arrangement, said first cross-strap arrangement comprising a pair of adjustable length strap members mechanically joined at one end, each strap member comprises a respective mechanical anchoring means at another end, each said respective mechanical anchoring means being mechanically secured to a respective one of said plurality of anchor devices secured at said forward corner areas;

(ii) a second cross-strap arrangement, said second cross-strap arrangement comprising a pair of fixed length strap members mechanically joined at one end, each fixed length strap member also comprises a respective mechanical anchoring means at another end, each said respective mechanical anchoring means being mechanically secured to a respective one of said plurality of anchor devices secured at said rear corner areas;

(iii) an interconnecting strap member for attachment of at least one leash member, said interconnecting strap member comprising an adjustable length strap portion having one end centrally and mechanically joined to said first cross-strap arrangement and another end centrally and mechanically joined to said second cross-strap arrangement; and (iv) at least one leash member one end attached to said interconnecting strap member, said at least one leash member having an attachment structure at said one end for facilitating being moved along said adjustable length strap portion;

(c) attaching another end of said at least one leash member to a dog for being restrained; and (d) adjusting said pair of adjustable length strap members and said adjustable length strap portion to dimensionally conform to a size of said truck bed such that said dog being restrained is safely confined at all times to a space delineated by said truck bed.

12. A method of safely restraining a dog as described in claim 11, wherein:

said step of providing said dog restraint system comprises providing said dog restraint system having a plurality of similar leash members similarly secured to said adjustable length strap portion as said at least one leash member;

said step of attaching another end of said at least one leash member to a dog, comprises attaching a plurality of dogs to respective other ends of said plurality of similar leash members; and said step (d) comprises safely restraining said plurality of dogs to a space delineated by said truck bed.

* * * * *